F. Wicks,
Hay Fork.
No. 57,609.  Patented Aug. 28, 1866.
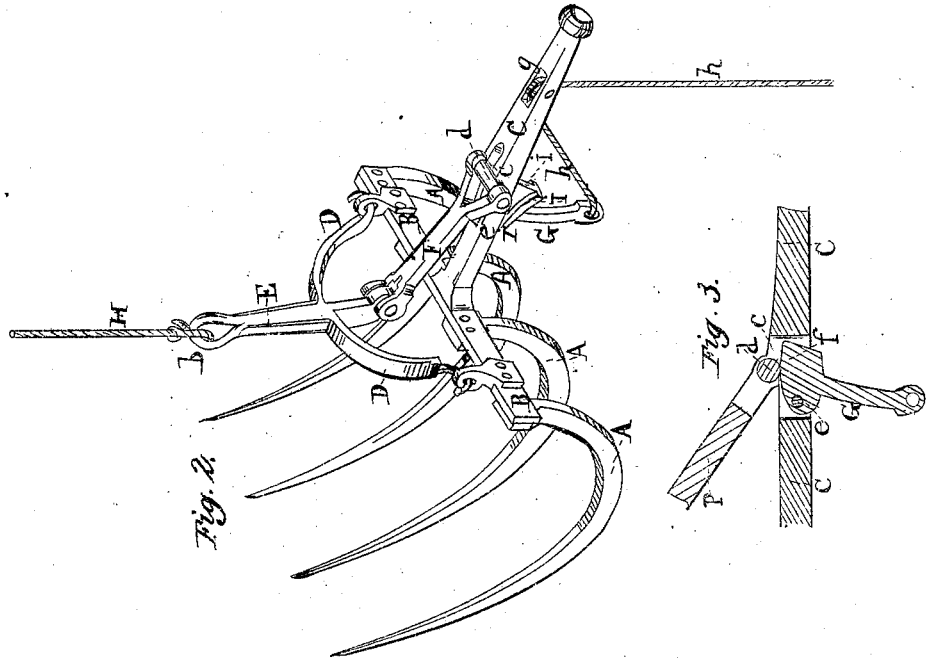
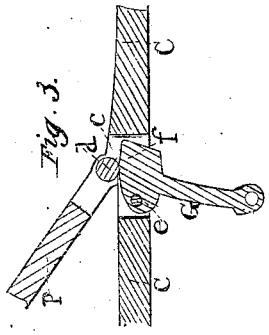
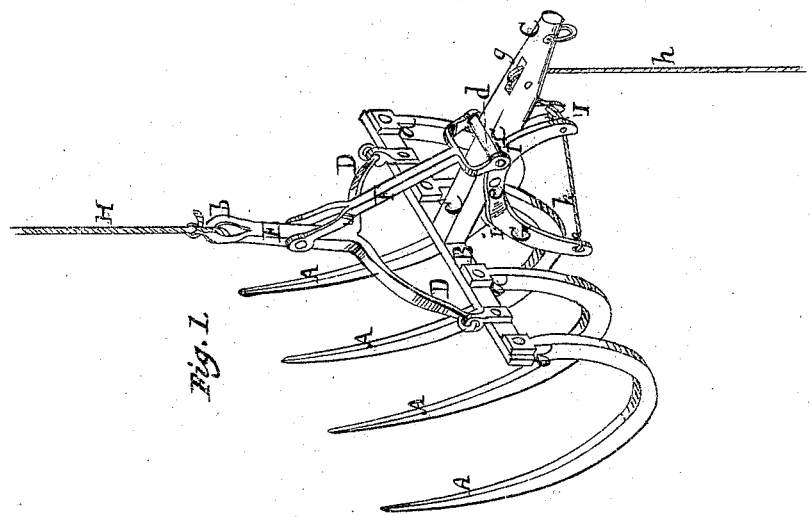
Witnesses.  Frank Wicks,
By atty. A. B. Stoughton.

UNITED STATES PATENT OFFICE.

FRANK WICKS, OF UPPER SANDUSKY, OHIO.

IMPROVEMENT IN HORSE HAY-FORKS.

Specification forming part of Letters Patent No. 57,609, dated August 28, 1866.

*To all whom it may concern:*

Be it known that I, FRANK WICKS, of Upper Sandusky, in the county of Wyandott and State of Ohio, have invented certain new and useful Improvements in Horse Hay-Forks, for elevating and delivering hay in stacking or storing the same; and I do hereby declare the following to be a full, clear, and exact description of the same, reference being had to the accompanying drawings, making a part of this specification, in which—

Figure 1 represents, in perspective, one of the forks in question. Fig. 2 represents, in perspective, a modified form of the fork. Fig. 3 represents a section through a portion of the fork, to better show the trigger or tripping device.

Similar letters of reference, where they occur in the several figures, denote like parts in all the drawings.

My invention relates more especially to the construction and arrangement by which the fork is made self-setting when thrust into the hay, without requiring the aid of the attendant; and it further relates to construction of parts by which the fork is made efficient in use, as will be explained hereinafter.

To enable others skilled in the art to make and use my invention, I will proceed to describe the same with reference to the drawings.

The tines or fingers A of the fork, as well as the bar or fork-head B, may be made of steel, for the sake of lightness and strength, and the ends of the fingers where joined to the fork-head are recessed and shouldered, so as to fit up snugly against one side and one edge of the bar B, as seen at $a$, so that a single rivet passed through the heel of the finger and the fork-head or bar makes a very strong and firm union.

From the center rear side of the fork-head projects a shank, C, and from points equidistant from the center of the fork-head, so as to maintain a true balance of the fork when suspended to the hoisting-rope, as at $b$, start the two ends of the bail D, which has upon its center a shank, E, with a brace, F, pivoted thereto.

In Fig. 1 the brace F is represented as pivoted to the shank E above or beyond the crown of the bail D, while in Fig. 2 said brace is pivoted to the shank below or under the crown of the bail. Either answers a good purpose.

On top of the shank C there is a notch, shoulder, or recess, $c$, (better seen in Fig. 3,) against which a roller, $d$, in the free end of the brace F takes, to set and hold the fork with its load in proper position for being elevated.

Below and in rear of said notch, shoulder, or recess $c$ a trigger, G, is pivoted, as at $e$, so that when free or unrestrained the rear portion $f$ of said trigger will drop away from said notch and the roller resting in it, and thus avoid the moving of said roller, which would trip the fork, until its load is to be dropped or delivered at the designated place. From the lower end of the trigger a cord, $h$, which is fastened there, passes up and over a pulley, $g$, in the shank C and outside of or beyond the shoulder or recess $c$, and thence to a point where the operator can readily seize it to trip the fork and allow its load to fall without drawing the fork out from under the load, which dribbles the hay.

The trigger G has guiding or controlling devices $i\ i$ upon it, which prevent it from swinging so far as to get out of easy control of the attendant. In one of the modifications this device is the fork on one side of the pivot and a small bar on the other side of it, and in the other modification it is curved flanges, which allow the trigger to move a certain distance each way, and then stop its further motion.

When the fork is suspended to the hoisting-rope H and the trigger-cord $h$ is slack, the operator, by seizing the shank C and forcing the fingers into or under the load to be carried by them, causes, by that action alone, the brace F to swing or move its roller $d$ into or against the shoulder $c$, and when he lets go the shank the fork is set, and the load is thus set until the brace is tripped by the trigger G. The brace is thus self-acting, and requires no attention from the operator. Or if the brace does not actually set the fork when the latter is thrust into or under the load, the first motion of the hoisting-rope H will positively move its roller into or against the shoulder $c$, so that it is certain, before the load starts and at the first starting up of the bail, to find its seat, and the weight of the load tends to keep it there.

Having thus fully described the construc- tion and operation of my hay-fork, what I claim therein is—

1. The hinged self-acting brace F, for setting the fork and holding it in proper carrying position under its load, substantially as described.

2. The combination of the hinged bail D, its shank E, and the brace F, pivoted to said shank and carrying a roller, $d$, as and for the purpose substantially as herein described.

3. In combination with the roller $d$ in the brace and the recess $c$ in the shank C, the pivoting of the trigger at a point behind and below said recess, so that when unrestrained it will swing out of the way and allow the brace and its roller to find their proper setting positions, substantially as described.

4. In combination with a trigger that is operated to throw the brace out of its seat by means of a cord passing over a pulley in rear of said seat, and arranged in the shank in rear thereof, the controlling devices $i\ i$, for restricting the motion of the trigger on each side of its center of motion or pivot, substantially as described.

5. In combination with the self-acting hinged brace F, a permanent notch, stop, recess, or its equivalent, for the purpose of receiving and retaining the brace, thereby holding the fork in proper position while elevating its load, substantially as described.

FRANK WICKS.

Witnesses:
W. J. FRAZIER,
A. J. WORMLEY.